United States Patent [19]

Gall

[11] 4,270,469
[45] Jun. 2, 1981

[54] COAL-FEEDING MECHANISM FOR A FLUIDIZED BED COMBUSTION CHAMBER

[75] Inventor: Robert L. Gall, Morgantown, W. Va.

[73] Assignee: The United States of America as represented by the United States Department of Energy, Washington, D.C.

[21] Appl. No.: 65,771

[22] Filed: Aug. 13, 1979

[51] Int. Cl.³ .............................................. F23G 5/00
[52] U.S. Cl. .................................. 110/245; 110/259; 110/270; 110/293
[58] Field of Search ............... 110/245, 234, 255, 257, 110/263, 268–270, 293, 329; 122/4 D

[56] References Cited

U.S. PATENT DOCUMENTS

| | | | |
|---|---|---|---|
| 1,630,387 | 5/1927 | Jacobus | 110/270 |
| 2,476,567 | 7/1949 | Sparks | 110/270 |
| 2,491,547 | 12/1949 | Bennett et al. | 110/269 |
| 2,693,173 | 11/1954 | Marquez, Jr. | 110/263 |
| 2,730,997 | 1/1956 | Birkner | 110/269 |
| 2,795,200 | 6/1957 | MacDurquhart | 110/270 |
| 2,932,264 | 4/1960 | Hurst | 110/293 |
| 3,861,331 | 1/1975 | Saitoh et al. | 110/257 |
| 4,142,625 | 3/1979 | Bourgeois | 198/570 |

Primary Examiner—Henry C. Yuen
Attorney, Agent, or Firm—Earl L. Larcher; Stephen D. Hamel; James E. Denny

[57] ABSTRACT

The present invention is directed to a fuel-feeding mechanism for a fluidized bed combustor. In accordance with the present invention a perforated conveyor belt is utilized in place of the fixed grid normally disposed at the lower end of the fluidized bed combustion zone. The conveyor belt is fed with fuel, e.g. coal, at one end thereof so that the air passing through the perforations dislodges the coal from the belt and feeds the coal into the fluidized zone in a substantially uniform manner.

4 Claims, 3 Drawing Figures

COAL-FEEDING MECHANISM FOR A FLUIDIZED BED COMBUSTION CHAMBER

BACKGROUND OF THE INVENTION

The present invention relates generally to atmospheric fluidized bed combustion, pressurized fluid bed combustion, fluidized bed coal gasification, or any other fluid bed application, and more particularly to a distribution system for uniformly feeding coal into the reaction chamber of the fluidized bed.

The ever growing demand for energy has greatly increased the reliance upon the combustion of coal for the generation of electrical power. The utilization of coal in combustion systems as previously known has not proven to be particularly efficient and also presented a considerable environmental problem due to the substantial quantities of polluting emissions from the stacks of various utility plants. The shortage of clean coal, i.e., low-sulfur coal, makes it increasingly difficult for the conventional furnace designs to provide adequate combustion of coal while maintaining pollutants within environmental limits without the utilization of expensive precipitators and other pollutant removal equipment.

A fairly recent improvement in coal combustion systems is in fluidized bed combustion processes which possess the capability of controlling particulate emissions as well as sulfur dioxide and $NO_x$ within the limits set by the Environmental Protection Agency while burning virtually any coal or low-grade fuels available in the United States. The fluidized bed combustion process has proven to be a highly efficient mechanism for extracting a significant percentage of available Btu values from the coal and converting this heat energy into useful products such as steam for use in a power generating plant.

A fluidized bed process is generally described as being provided by a bed of granular particulates initially supported in a combustion zone by a perforated grid through which air may be passed with sufficient velocity to suspend the particulates in a constantly moving "fluid-like" manner in the combustion zone above the grid. Generally a noncombustible material, such as limestone or dolomite, is used to provide the bed particulates. Coal particulates are introduced into the constantly stirred bed and are heated to a temperature sufficient to support the combustion of the coal. The temperature of the bed and the combustion process can be readily controlled by regulating the flow of air through the grid and the volume of coal. Also, the particular heat transfer surfaces, e.g., steam generating coils and the like, disposed in the combustion zone may be used to control the temperature of the combustion process. By employing limestone bed material in a combustion zone, a substantial percentage of the sulfur dioxides released during the combustion of the coal react with and are absorbed by the limestone. The nitrous oxides ($NO_x$) are maintained at a relatively low formation level due to the low combustion chamber temperature of about 1500° to 1600° F. required for practicing the fluidized combustion process.

It is believed that fluidized combustion processes will be particularly useful for steam generation and are expected to be of significant value in helping to overcome the energy problems that we are presently facing. One of the difficulties associated with the fluidized bed combustion process is in the techniques utilized for the introduction of the coal into the fluidized bed. For example, the practices presently employed for introducing coal into the fluidized bed require a plurality of conduits or pipes of dissimilar lengths extending into the fluidized bed to different locations so that the coal distribution can be provided with some degree of uniformity. However, even with such an extensive conduit network within the fluidized bed, it has been found that the uniformity of the coal distribution is insufficient for achieving optimum efficiency from the fluidized bed operation. Screw-type conveyors have not proven practical due to a lack of uniformity in distribution of the feed in the bed and the relatively low back pressure at which the conveyors will function. Also, with known coal feeding systems variations in moisture and feed size have presented significant problems often resulting in total shutdown of the fluidized bed.

Accordingly, it is the primary aim, or goal, of the present invention to provide apparatus for feeding coal into a fluidized bed combustor with a more uniform distribution than previously attainable. The coal-feeding means of the present invention is utilized in the fluidized bed combustor which is typically of an elongate vertically oriented configuration with an air inlet at the lower end of the combustion chamber and a discharge or exhaust at the upper end of the combustion chamber. The coal-feeding means of the present invention transports coal into the combustion chamber at a location intermediate the air inlet and the discharge and comprises a movable conveying means which is transversely disposed within the combustion chamber. Coal supply means are placed in registry with the conveying means at a location adjacent one end of the conveying means for delivering to the latter a preselected quantity of coal. Drive means are, in turn, coupled to the conveyor means for driving the conveyor means and transporting the coal placed thereon into the combustion chamber. The conveyor means is characterized by being provided with a plurality of substantially uniformly spaced-apart passageways extending therethrough so that air from the air inlet will pass through these passageways in the conveyor means and displace the coal from the conveyor means into the combustion chamber above the conveying means. This coal-feeding means of the present invention provides the introduction of the coal at the bottom of the fluidized bed with a substantially uniform distribution of the coal across the entire cross section of the combustion chamber and also provides a maximum residence time of the coal within the bed so as to facilitate the control of the coal feed.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DESCRIPTION OF THE DRAWINGS

In the accompanying drawings,

FIG. 3 is a fragmentary view illustrating the perforated belt utilized as the conveyor in the coal-feeding system of the present invention.

DETAILED DESCRIPTION OF THE INVENTION

Figure 1:
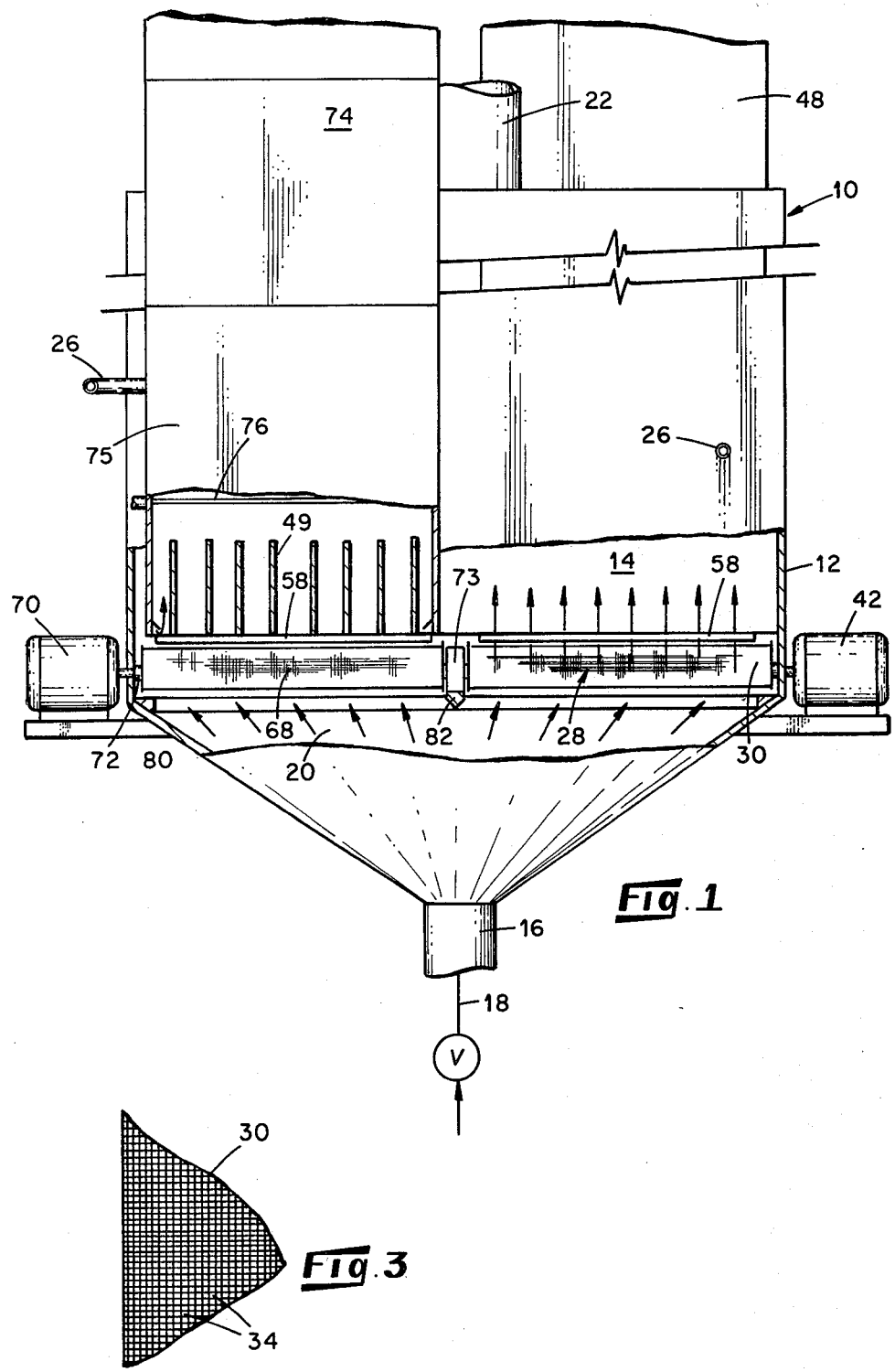
FIG. 1 is a front elevational view, partly broken away, showing an embodiment of the present invention in which the fluidized bed combustor is provided with a pair of fuel feeding conveying mechanisms disposed in a side-by-side relationship and adapted to rotate in opposite directions.

The fluidized bed combustor generally shown at 10 in which the coal feeding means of the present invention may be utilized is shown as being of a conventional construction defined by a generally rectangular configuration with elongated, vertically extending walls 12 formed of a suitable metal or refractory material. A combustion zone or chamber 14 is shown in the confinement of the walls 12. Coal in a size range of about 1 micron ($\mu$) to about 1.5 inches is combusted in the combustion zone 14 in a stirred or fluidized bed of limestone or dolomite particulates in a size range of about 1$\mu$ to about 8 mesh. Air is used for both the fluidizing and the combustion-supporting medium.

The air for fluidizing and supporting the combustion is introduced through an air inlet 16 from a suitable source, not shown, through a valve conduit 18 into a plenum chamber 20 disposed at the lower end of the combustor 10. At the opposite or uppermost end of the combustor 10 is an exhaust duct 22 through which products of combustion including ash are discharged into a conventional pollutant removing apparatus (not shown) such as a suitable mechanical dust collector which may be placed in line with an electrostatic precipitator so as to assure that ash or other environmental pollutants are satisfactorily removed from the exhaust stream.

The combustor 10 is also provided for a discharge for solid particulates from the fluidized bed when an excessive amount of the limestone particulates build up in the fluidized combustion zone 14. To provide this discharge one or more extraction conduits 24 penetrate the combustion zone at suitable locations in the fluidized bed so as to permit the withdrawal of hot bed material from the combustion zone 14. Such withdrawal maintains a proper size distribution and density of the particulate material within the combustion zone 14. Also within the combustion zone is a mechanism by which heat generated during the combustion process may be extracted for a useful purpose. As shown in the drawings, a serpentine coil 26 is placed in the zone 14 for the purpose of conveying water into the zone 14 to generate steam for the operation of a suitable prime mover (not shown).

In conventional fluidized beds the air for supporting the combustion and fluidizing the particulates is passed through a fixed distribution grid disposed at the lower end of the combustion chamber 14. This grid or grate provides for uniform distribution of the air into the combustion zone 14 so as to provide and maintain the desired fluidization of the limestone and coal particulates. However, as briefly pointed out above, the coal feed systems as previously employed in fluidized bed combustors required the placement of a plurality of different length conduits in the fluidized bed for injecting pulverized coal at various locations within the fluidized bed in an effort to provide uniform combustion and fluidization. These coal-feeding conduits fell short of their intended goal and did not provide the uniform coal feed nor the uniform combustion as envisioned.

The present invention provides a substitute for both the previously used fixed air distribution grid and the coal feed mechanisms with a perforated movable coal-feeding mechanism as generally shown at 28. This coal-conveying mechanism 28 acts as the air distributor as well as the coal-feeding mechanism and is provided by a continuous conveyor belt 30. The belt 30 extends transversely into the elongate combustor across the entire cross section thereof so as to allow for the uniform distribution of feeding of the coal at the lowermost end of the combustion zone 14 where the coal feed is most advantageously utilized.

As shown in FIG. 1, the fluidized bed combustor is provided with two conveyor systems each having a movable conveyor belt. While two such conveyor belts are shown, it is to be understood that the fluidized bed may be operated with a single belt or with any desired plurality of belts. Further, in instances where a plurality of belts are used, such as in FIG. 1, it may be desirable to rotate the belts in opposite directions for assuring uniform coal feeding as will be described in greater detail below.

The conveyor belts used as the air distribution and coal feeding means may be formed of any suitable heat resistant material capable of withstanding the temperatures encountered in the fluidized bed combustion zone. For example, a metal mesh with suitable openings through the mesh for achieving the desired air and coal distribution may be satisfactorily employed as the conveyor in the present invention. Also, a metal belt with transversely disposed hinges coupling perforated segments may be readily utilized for the conveyor. As shown in FIG. 3, a metal mesh belt 30 is provided with a plurality of through-going perforations 34 of a size in the range of about 0.05 to about 0.25 inch to assure that the coal particulates in the aforementioned size range do not drop through the perforations in the belt 30 and to assure that sufficient air can be passed through the belt to effect the desired fluidization of the bed material. The conveyor belt 30 employed in the coal-feeding mechanism of the present invention is driven by a drive roller as generally shown at 36, with this drive roller 36 being disposed in a chamber 33 offset from the combustion zone 14 with the belt 30 extending into the chamber 38 for separating a selected length of the belt from the combustion chamber 14. This drive roller 36 may be driven by a suitable electric motor through a suitable gear reduction or other speed control mechanism (not shown). At the opposite end of the belt from the drive roller 36 is an idler roller 43 which may also be disposed in a boxed-in section 44 removed from the combustion zone to assure that the belt 30 traverses the full cross section of the combustor. The chamber 38 is penetrated by a rectangularly shaped coal chute 46 coupled to a suitable coal hopper 48. This coal chute 46 may be provided with a plurality of vertical plates 49 or other suitable coal distributing mechanisms to assure that coal passing from the chute 46 onto the conveyor belt 30 will be substantially uniformly distributed across the width of the belt 30. The chute 46 is also provided with a pair of spaced-apart valves 50 and 52 which are preferably in the shape of star wheels so as to allow a preselected quantity of coal to be fed onto the conveyor belt from the hopper 48. These star wheel valves may be provided with suitable vents 54 and 56 for permitting the feeding of the coal onto the belt 30 without allowing the pressure from the fluidized bed to enter the coal hopper 48. The operation of the valves 50 and 52 may be controlled in any suitable manner in an out-of-phase relationship so as to regulate the quantity of coal being fed to the conveyor.

In order to assure that the coal is at a substantially uniform level across the width of the belt 30 a projection 58 in the form of a scraper or leveler is disposed in the chamber 38 adjacent the entrance into the combustion zone 14 and projects to a position slightly above the surface of the belt. The projection 58 may be set at a spacing from the belt to maintain the coal on the belt at a depth of about 1 to 2 inches or even less depending upon the desired operation of the system. Of course if desired, the scraper 58 may be vertically adjustable to provide for any selected change in the depth of the coal on the conveyor belt 30. Also within the chamber 38 at a location underlying the belt 30 is a plate 60 that extends the width of the belt and is utilized for inhibiting the sifting of the coal particulates through the belt at a location within the chamber 38. Once the coal on the belt enters the fluidized combustion zone the air passing through the belt system will prevent or substantially minimize sifting of the coal through the belt. As the coal on the belt 30 traverses the combustion zone 14 the smaller particulates are driven from the belt earlier than the larger particulates. However, with a suitable size distribution of the coal, a substantially uniform feed of the coal into the combustion zone may be provided over the entire length of the belt 30 as it traverses the combustion zone 14. In the event some coal still remains on the belt as it completes its traversal of the combustion zone 14, a suitable air jet 62 near section 44 may be used to direct a stream of high pressure air against the belt 30 and dislodge the coal particulates from the belt into the fluidized combustion zone.

It may be also desirable to employ a plurality of air splitters, one of which is shown at 64, between the upper and lower levels of the belt to direct the flow of air to aid in the dislodging of the coal particulates from the belt 30 in a more uniform manner as well as to control the feed of the air or distribution of the air into the fluidized bed above the belt.

Figure 2:
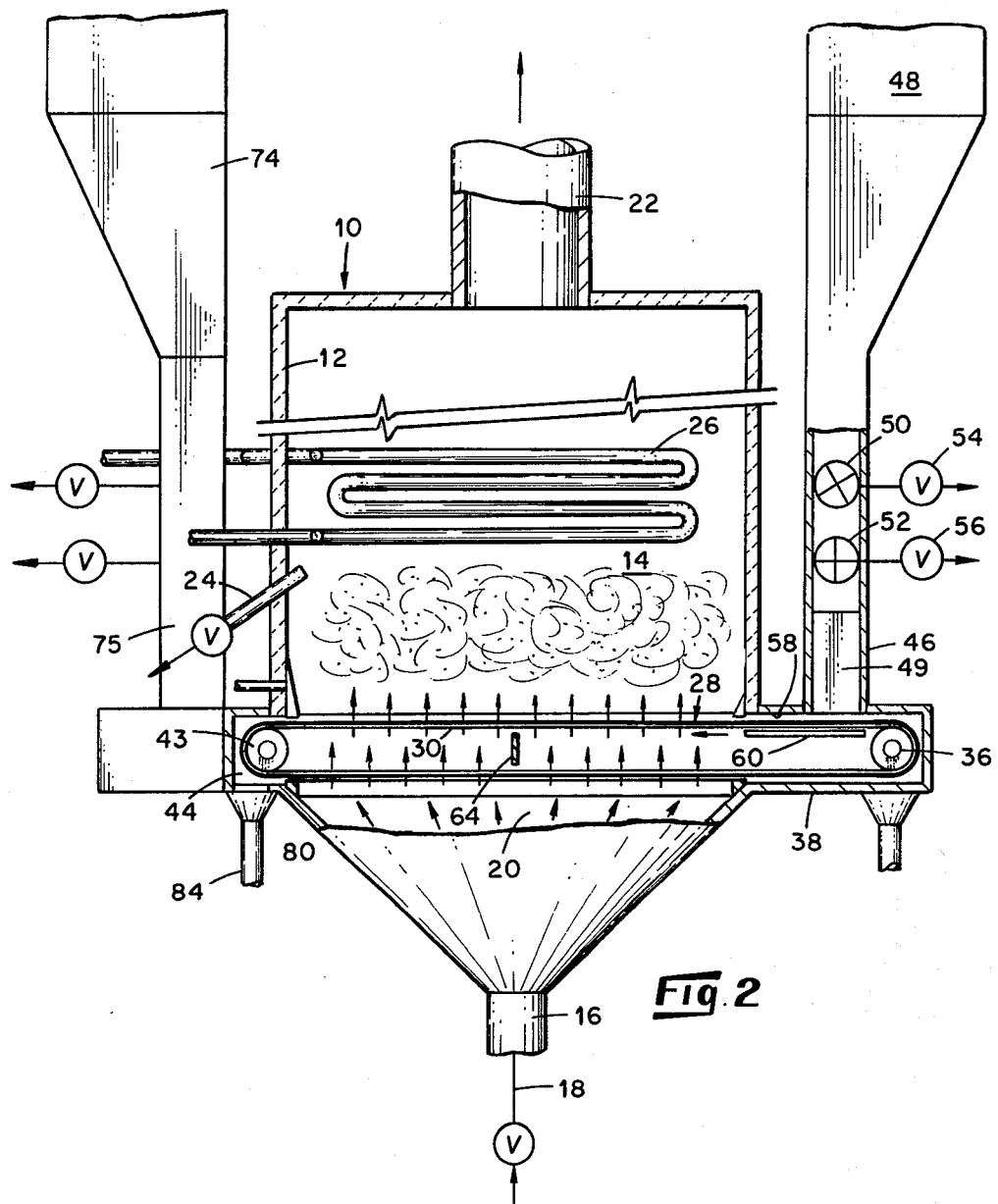
FIG. 2 is a side elevational view showing further details of the conveyor system used for feeding the fluidized bed combustor with coal.

As previously described above, the present invention is shown (FIG. 2) utilizing a pair of conveyor belts which travel in opposite directions. The second belt of this belt system is shown at 68 and is provided with a suitable drive motor 70 coupled to a drive roller 72. Suitable bearings, such as shown at 73, are placed at the ends of the rollers to facilitate the rotation thereof. Like belt 30, belt 68 is in registry with a coal hopper 74 having a chute 75 provided with a valve arrangement similar to that in chute 46 of coal hopper 48. One such valve of this valve arrangement is generally shown at 76 and is coextensive with the width of the coal hopper chute 75.

Underlying each end and side of the belts 30 and 68 adjacent the walls 12 is shown a suitable flange arrangement 80 which is utilized to prevent the air from passing around the ends and sides of the belts. Also at a location underlying the bearing 73 is an air splitter 82 or some other mechanism for diverting the air flow into the perforated belt system rather than against the bearing 73. By employing a belt system wherein the adjacent belts travel in opposite directions the feeding of the coal particulates into the combustion zone 14 of the fluidized bed can be maintained in a highly uniform manner. Also by using a plurality of oppositely traveling belts a fluidized bed reactor of a size considerably greater than presently obtainable may be constructed without encountering a significant coal-feeding problem as would be present if the known coal-feeding mechanisms were utilized.

In operation, the combustion of the coal within the combustion chamber 14 may be initiated in a typical manner. For example, a quantity of the limestone or dolomite particulates may be placed upon the top of the belt 30 from the hoppers 48 and 74 and the air passed into the plenum 20 and through the conveyor belts 30 and 68 for forcing the granular solids into a violent motion in the chamber above the belt. The slightly pressurized air continually agitates the dry solids while raising them several feet above the surface of the belt. The crushed coal may be then fed from the hoppers onto the belts into this mass of rapidly fluctuating or churning solids and ignited by a suitable ignition device, such as an oil or propane igniter. The burning coal then heats the solids which continually contact the coils 26 or other heating transfer mechanisms within the combustion zone 14 for transferring the thermal energy from the combustion zone 14 to a suitable point of use. The operation of the fluidized bed is achieved at a temperature of about 1500°–1650° F. which is substantially less than that of conventional combustion systems so as to significantly inhibit the formation of nitrogen oxides which are major pollutants produced by the burning of coal in conventional systems. Further, the limestone or dolomite sorbs the sulfur dioxides generated at these low temperatures. The coal-feeding mechanism of the present invention provides for the uniform distribution of coal throughout the entire cross section of the combustion zone. The metering of the coal to the conveyor system requires a relatively simple mechanism so that variances in coal density as caused by moisture would be an easily controllable operating parameter. (Also the fact that the finer fuel or coal particles would be blown from the conveyor before the larger pieces, the control of the conveyor speed and the width of the fluid bed may be varied to assure uniform coal feeding.)

While the present invention as described above is directed primarily to the fluidized combustion of coal, it will appear clear that the described fluidized bed could be used as a thermal dryer, oxidizer, reducing bed, roaster, etc. Also, the fuels employed in such fluidized beds may be selected from such materials as oil, shale, tar sand, biomass, refuse, etc. When using a fuel which forms clinkers, a suitable clean-out door such as generally shown at 84 in compartment 44 can be utilized for the removal of the clinkers or other solid material which may fall back onto the conveyor belts.

It will be seen that the present invention provides a significant improvement in the fluidized bed combustors as known in the art which will permit the operation of the fluidized bed in a more efficient manner as well as permit the enlargement of the fluidized bed combustors to a size not previously attainable due to problems encountered in the feeding of the coal particulates.

What is claimed is:

1. A fuel feeding apparatus for a fluidized bed combustion system comprising an elongate vertically oriented combustion chamber, air inlet means at lower end of said chamber for supplying combustion supporting air into said chamber, discharge means at the upper end of said chamber for exhausting products of combustion from said chamber, the plurality of endless conveyor belts disposed transversely in said chamber in a side-by-side relationship with one another and with each conveyor belt projecting across the entire cross section of said chamber, each conveyor belt projecting into a compartment therefor disposed at a location laterally offset from said combustion chamber and opposite ends of adjacently disposed conveyor belt, discrete drive means coupled to each of said conveyor belts for driving adjacently disposed conveyor belts in opposite directions, discrete fuel supply means for each conveyor belt comprising a chute in registry with each said compartment, valve means associated with each chute to control the flow of fuel through the latter for providing the conveyor belt in registry therewith with a preselected quantity of fuel and for effecting delivery of said fuel into the combustion chamber from opposite sides thereof upon displacement of the oppositely moving conveyor belts by said drive means, and passageways through each of said conveyor belts for placing said air inlet means in registry with said combustion chamber to effect the displacement of fuel from the conveyor belts into said combustion chamber upon passage of air through said passageways.

2. The feeding apparatus claimed in claim 1 wherein said passageways are of a size in the range of about 0.05 to 0.25 inch.

3. The fuel feeding apparatus claimed in claim 1 wherein said fuel is coal in a particle size range of about $1\mu$ to 1.5 inches.

4. The feeding apparatus claimed in claim 1, wherein scraper means is disposed in each said compartment at a location above the conveyor belt in registry therewith for uniformly spreading the fuel over the surface of the conveyor belt to a selected depth prior to the fuel entering the combustion chamber.

* * * * *